United States Patent Office 3,347,794
Patented Oct. 17, 1967

3,347,794
LUBRICANT GREASE
Fred K. Kawahara, Cincinnati, Ohio, assignor to Standard Oil Company, Chicago, Ill., a corporation of Indiana
No Drawing. Filed Sept. 15, 1966, Ser. No. 584,041
11 Claims. (Cl. 252—49.6)

ABSTRACT OF THE DISCLOSURE

Bis(triphenyl silyl) perfluorodicarboxylic acid esters having the formula

wherein $n$ is 1–8, and $\phi$ is phenyl, are chemically and thermally stable materials useful in high-temperature grease compositions.

---

This application is a continuation-in-part of Ser. No. 354,140, filed Mar. 23, 1964, and now abandoned.

The present invention relates to a new lubricant grease component and to grease compositions containing this component. More particularly, the present invention relates to bis(triphenyl silyl) perfluorodicarboxylic acid esters as new compositions of matter and to grease compositions containing these esters.

Very high temperatures resulting from high speed operation of machines, engines, etc. have resulted in a great need for lubricant greases which are stable at temperatures of 600° F. and higher. This need is especially pronounced in applications where lightly loaded bearings are used to control motors for sonic and/or supersonic aircraft and spacecraft, both manned and unmanned. Requirements of lubricants for applications of this type have grown more and more difficult to fulfill as the temperatures encountered have become progressively higher. Progress in the art, however, has led to development of greases which are capable of withstanding relatively high temperatures, e.g. about 400 to 450° F. This has been made possible through development of new thickening agents having special properties because the thickeners often used in lower temperature applications, such as lithium soaps of high molecular weight carboxylic acids and the like, are unsuitable at the higher temperatures. Typical of the thickening agents developed to meet the requirements of high temperature applications are ammeline, the arylurea thickeners described in U.S. 2,710,839; U.S. 2,710,840; and U.S. 2,710,841, and the ureido thickeners described in U.S. 3,015,625. When the need arose for greases stable at temperatures as high as 600° F., it was soon discovered that, although known thickening agents were suitable for use at temperatures in this range, the lubricant vehicles known to the art possess various shortcomings making them disadvantageous for use in high temperature applications.

In accordance with the present invention, new grease compositions comprising bis(triphenyl silyl) perfluorodicarboxylic acid esters are provided for use at elevated temperatures. Also, according to the present invention, it has now been found that a lubricant grease suitable for use in applications at elevated temperatures in the range of 600° F. and higher is formulated from thickening agents known to the art, and a lubricant vehicle made from silicone polymer oils admixed with a bis(triphenyl silyl) perfluorodicarboxylic acid ester. Additionally, it is to be expected that such a grease composition will be effective at temperatures much higher than 600° F. in particular applications where pressure is reduced, such as, for example, in lightly loaded bearings used to control motors for spacecraft operating outside the earth's atmosphere under conditions of essential vacuum.

Bis(triphenyl silyl) perfluorodicarboxylic acid esters of the present invention are characterized by the following structural formula:

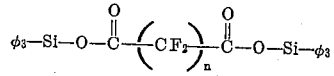

wherein $n$ is 1–8, and $\phi$ is phenyl. Of compounds of this type, bis(triphenyl silyl) perfluoroglutarate having the following structural formula:

is preferred. These compounds are chemically and thermally stable. For example, these compounds will typically melt at elevated temperatures in the range of 300 to 550° F. Specifically, the above-described compound, bis(triphenyl silyl) perfluoroglutarate melts at from about 446° F. to 453° F. This high melting point characteristic makes these compounds excellent for use in high temperature grease formulations both in small amounts as additives and in larger amounts together with silicone polymer oil as the lubricant vehicle.

The bis(triphenyl silyl) perfluorodicarboxylic acid esters typically are prepared by reacting triphenylsilanol with a dicarboxylic acid chloride of the following general formula:

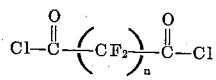

wherein $n$ is 1–8, in the ratio of two moles of triphenylsilanol to one mole of dicarboxylic acid chloride. The reaction is carried out in solvents at room temperature and atmospheric pressure. Solvents are then removed by reducing the pressure and the residue remaining is worked with an alcohol.

The bis(triphenyl silyl) perfluorodicarboxylic acid ester will be present in an amount which will vary depending upon the particular application. To employ the dicarboxylic acid ester in additive amounts and in other applications, it becomes advantageous to employ larger amounts of these materials in admixture with silicone polymer oils as the lubricant vehicle. Because the bis (triphenyl silyl-perfluorodicarboxylic acid esters are relatively expensive, it will not be practical in most applications to employ these materials in amounts greater than 50 percent by weight of the total grease composition. Accordingly, the concentration of bis (triphenyl silyl) perfluorodicarboxylic acid ester will range broadly from more than incidental impurities to about 50 percent by weight. Typically, they will be present in an amount from about 0.1 to 50 percent and preferably from about 1 to about 10 percent by weight.

Conventional silicone polymer oils are used in admixture with bis(triphenyl silyl) perfluorodicarboxylic acid esters to provide an effective composition. Typically, these silicone polymer oils will have the following unit structure:

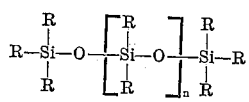

wherein R represents alkyl, aryl, alkaryl, aralkyl, and cycloalkyl groups. Such compounds may be produced by well-known methods, e.g. the hydrolysis of dialkyldichlorosilanes or dialkyldiethoxysilanes. For purposes of the present invention, only those polymers which are high boiling liquids within the lubricating oil viscosity range are suitable, these generally possess a viscosity at 77° F. which is within the range of from about 50 to about 2000 centistokes. Such products are typically colorless and inert, have very low volatility and undergo relatively slight change in viscosity for a given change in temperature. Relatively common oils of this type are dimethylsilicone polymer, phenylmethylsilicone polymer, chlorophenyl-methylsilicone polymer, etc., it being preferred to employ the phenylmethylsilicone polymer in accordance herewith. Methods of preparing such compounds are taught in numerous patents, e.g. U.S. 2,410,346 and U.S. 2,456,496, and in the literature such as "Chemistry of the Silicones" by Rochow, page 61 et seq.

The preferred silicone polymer oil is a water white phenylmethylsilicone typically having the following properties:

TYPICAL PROPERTIES

| | |
|---|---|
| Color | (1) |
| Viscosity, centistokes at: | |
| 77° F. | 600 |
| 210° F. | 20 |
| Acid number | 0.0 |
| Flash point, ° F. | 610 |
| Fire point, ° F. | 700 |
| Auto Ignition temperature, ° F. | 900 |
| Freezing point, ° C. | −5 |
| Specific gravity at 25° C. | 1.115 |
| Refractive index at 25° C. | 1.566 |
| Thermal stability, 8 hrs. at 800° F. (Closed glass tube, inert atmosphere): | |
| Fluid appearance | (2) |
| Viscosity change at 210° F., percent | 8 |
| Acid number change | 0.0 |
| Volatility at 550° F., percent: | |
| 4 hours | 5 |
| 24 hours | 17 |
| 48 hours | 25 |
| 72 hours | 30 |
| Gel time at 550° F., hours | 600–700 |
| Gas, calculated (molecules of gas per 100 e.v.) | 0.035 |

[1] Water white.
[2] No change.

A silicone polymer oil of this type is available commercially as "QF–6–7024 Fluid" from Dow Chemical Company.

The silicone polymer oil will be typically in an amount from about 10 to about 80 percent by weight of the total grease composition and preferably from about 20 to about 70 percent by weight.

Thickening agents suitable for applications at elevated temperatures in the range of 600° F. and higher may be employed with the bis(triphenyl silyl) perfluorodicarboxylic acid ester containing vehicle to prove a lubricant grease composition capable of long-term effective operation at elevated temperatures. Suitable thickening agents for such applications include the high melting aromatic ureas, di-ureas, amides and di-amides, all of which contain at least one

wherein R is an aryl radical. Suitable arylcarbamyl compounds have the following empirical structures:

$$R-NH-\overset{O}{\underset{\parallel}{C}}-NH-R \quad (1)$$

$$R-NH-\overset{O}{\underset{\parallel}{C}}-NH-R_1-NH-\overset{O}{\underset{\parallel}{C}}-NH-R \quad (2)$$

$$R-\overset{O}{\underset{\parallel}{C}}-NH-R \quad (3)$$

$$R-\overset{O}{\underset{\parallel}{C}}-NH-R_1-NH-\overset{O}{\underset{\parallel}{C}}-R \quad (4)$$

$$R-NH-\overset{O}{\underset{\parallel}{C}}-R_1-\overset{O}{\underset{\parallel}{C}}-NH-R \quad (5)$$

wherein R represents unsubstituted or substituted aryl or alkaryl radicals containing no more than 12 carbon atoms; and $R_1$ is divalent arylene, e.g. phenylene, biphenylene, napthylene, etc., these radicals may be the same or different, e.g. phenyl, biphenyl, napthyl, etc., in each compound. The aryl or alkaryl, or arylene radicals may be substituted radicals containing various reactive substituents, such as hydroxy, carboxy, halo, nitro, etc. The compound should have a melting point in excess of 450° F.

Examples of amides and di-amides which have been found to yield excellent greases when employed as thickeners are N-benzoyl-4-amino-biphenyl, N,N'-dibenzoylbenzidine, N,N' - dibenzoyl-p-phenylene-diamine, and N,N'-bis-(p-nitrobenzoyl)-benzidine. Such compounds may be readily prepared by techniques well known to the art, e.g. by reaction of an aromatic amine or diamine, such as phenylene-diamine, aniline, benzidine, etc., with an aroyl halide, e.g. benzoyl chloride. Diamines, such as may be prepared by reacting an aromatic mono-amine, e.g. aniline, with an aroyl halide, such as a phthalyl chloride, may likewise be employed in accordance herewith. These compounds may be employed alone or in combination to thicken oleaginous vehicles to grease consistency.

Examples of various ureas and di-ureas which have been found useful as thickeners are p-carboxyl-1,3-diphenylurea;
p-chloro-1,3-diphenylurea;
1,3-di-(1-naphthyl)-urea;
4,4'-bis-[3-(p-biphenylyl)-ureido]-biphenyl;
1-(p-carboxyphenyl)-3-(p-biphenylyl)-urea;
1-(p-carboxyphenyl)-3-(o-biphenylyl)-urea;
1,3-di-(p-biphenylyl)-urea;
1,3-di-(o-biphenylyl)-urea;
4,4'-bis-(3-phenylureido)-3,3'-dimethoxy-biphenyl;
p-phenylurethan-1,3-diphenyl-urea;
p-cyano-1,3-diphenyl-urea;
1-(2,5-dichlorophenyl)-3-phenyl-urea;
4,4'-bis-[3-(2,5-dichlorophenyl)-ureido]-biphenyl;
1,4-bis-[3-(2-chlorophenyl)-ureido]-benzene;
1,4-bis-[3-(3-chlorophenyl)-ureido]-benzene;
1,3-bis-[3-(3-chlorophenyl)-ureido]-benzene;
and 1,3-bis-[3-(2-chlorophenyl)-ureido]-benzene.

Comounds of this type may readily be prepared by reacting an amine or diamine, such as aniline, benzidine, phenylenediamine, etc., with an isocyanate or diisocyanate of benzene, diphenyl, etc. It should be understood that the specific arylcarbamyl compounds set forth above are enumerated for purposes of illustration and not of limitation. Compounds of this class may be employed alone or in combination with other such compounds to thicken oleaginous vehicles in accordance herewith.

Superior arylcarbamyl-thickened greases are those ureas (Formula 1 above) and di-ureas (Formula 2 above) which are prepared from a mixture of two different amines and one diisocyanate or a diamine and two mono-isocyanates, as described in U.S. 2,710,840 and U.S. 2,710,841. Also, greases made from bitolylene diisocyanate, p-chloroaniline, and p-toluidine are preferred.

A particularly well suitable thickening agent preferred for many applications is a cyanuramide or cyanurodiamide, such as ammeline having the formula:

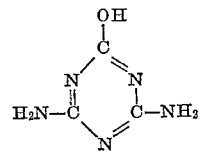

In addition to those thickening agents specifically set forth and included herein, other thickening agents known to the art as suitable for use at elevated temperatures in the range of 600° F. and higher may be employed with lubricant vehicles disclosed herein to make a grease composition suitable for applications at temperatures in their range.

While it is preferred to employ the thickening agents described above to make greases for use at elevated temperatures in the range of 600° F. and higher, in particular applications where temperature requirements are less severe lubricant vehicles within the scope of the present invention may be employed in conjunction with ordinary thickening agents, such as lithium soaps of high molecular weight carboxylic acids and the like, to make grease compositions which are suitable for lower temperature applications.

The thickening agent typically will be present in an amount from about 10 to about 50 weight percent of the total grease composition with the range from about 20 to about 40 being preferred.

It is preferred to make greases within the scope of the present invention by preparing the thickener apart from and then admixing it with the lubricant vehicle followed by milling in a colloid mill, three-roll mill, etc. It has also been found, when employing a silicone vehicle, that improved properties may be imparted to the grease by "heat-treating" the grease mixture, i.e. subjecting same to a temperature of about 450° F. for at least about half an hour and preferably longer, e.g. from about 1 to 20 hours. Prolonged heating at such temperature may evaporate a portion of the lubricant vehicle; this loss should be replaced and then the mixture should be milled. If desired, the heating and re-addition of vehicle may be repeated before milling. In addition, other methods known to the art may be used to prepare greases within the scope of the present invention so long as the result is an intimate mixture of all ingredients. For example, the thickener may be formed in situ in the oil by introducing the reactants and the desired amount of lubricant vehicle, heating to about 450° F. for a relatively short time, e.g. from about five minutes to an hour to drive off volatile byproducts, and then cooling and milling the mixture. As a slight modification, a solvent, such as dioxane, may be employed as a diluent and mutual solvent for the reactants. The solvent is then evaporated and the grease is milled, etc. substantially as set forth.

The method of forming the thickener in situ in the lubricant vehicle described above is claimed in U.S. 2,710,841.

The following examples are given for the purpose of illustrating the practice of the present invention. However, it is to be understood that these examples are given by way of exemplification only and do not serve to limit in any way the scope of the present invention.

*Example 1*

A lubricant grease was prepared to contain 35 percent by weight ammeline and 65 percent by weight Dow Corning silicone polymer oil (QF-6-7024). This grease was used as a control. It was tested in a lightly loaded antifriction bearing operated at a temperature of 600° F. under a 50 pound radial and a 25 pound axial load at a rate of 10,000 r.p.m. The apparatus and test procedures used were in cooperation with the Coordinators Research Council Test L-35-59 technique developed and published by the Coordinators Research Council, 30 Rockefeller Plaza, New York 20, N.Y. This grease was operated for 113 hours before failure.

*Example 2*

A grease composition of the present invention was prepared by adding 27.6 grams of triphenylsilanol in 58 grams of pyridine to 13.8 grams of perfluoroglutaroyl chloride in 20 milliliters of benzene at room temperature. The sovent was removed by reducing pressure and the residue was worked with 170 milliliters of absolute ethanol. Sixteen grams of colorless solid product melting at 446 to 453° F. was obtained. Three percent by weight of this product was then added to the grease composition as prepared in Example 1 and the formulation was tested in accordance with the procedure described above in Example 1. This grease was operated for 183 hours before failure for a gain of 70 hours in effective operating time.

*Example 3*

A grease composition was prepared as in Example 2 and tested in accordance with the L-35-59 technique. The grease was successfully operated for 207 hours before failure.

*Example 4*

A grease was prepared as described in Example 2 and tested in accordance with the L-35-59 technique. This grease was successfully operated for 172 hours before failure.

*Example 5*

A grease formulation was prepared to contain the following: 82.5 percent by weight of Dow Corning 510 silicone fluid; 9 percent by weight bitolylene diisocyanate; 3.7 percent by weight para-toluidine; and 4.5 percent by weight para-chloroaniline compound. This grease was also used as a control. It was tested in a lightly loaded antifriction bearing operated at a temperature of 450° F. under a 5 pound radial and a 25 pound axial load at a rate of 10,000 r.p.m. in accordance with L-35-59 technique. The control grease was operated for about 450 hours to failure.

*Example 6*

A grease as described in Example 5 was prepared to contain 3 percent bis(triphenyl silyl) perfluoroglutarate and was tested in the same fashion as described in Example 5. This grease was successfully operated for 790 hours without failure.

From the foregoing examples, especially in view of the comparisons with the control formulations, it can readily be seen that the presence of bis(triphenyl silyl) perfluorodicarboxylic acid esters contributes to grease formulations which, in general, can be advantageously used for much longer periods of time, thus making the inventive formulations particularly well suited in high temperature bearing applications.

I claim:
1. Bis(triphenyl silyl) perfluorodicarboxylic acid esters having the formula

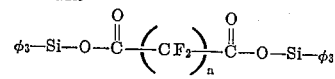

wherein $n$ is 1–8 and $\phi$ is phenyl.

2. The composition of claim 1 wherein $n$ is 3.

3. The method of making the esters of claim 1 which comprises reacting triphenylsilanol with a dicarboxylic acid chloride having the formula

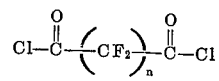

wherein $n$ is 1–8, said triphenylsilanol and said acid chloride being present in the ratio of about two moles of triphenylsilanol to about one mole dicarboxylic acid chloride.

4. The method of claim 3 wherein $n$ is 3.

5. A lubricant grease composition comprising (a) a thickener; (b) a silicone polymer oil in the lubricating oil viscosity range; and (c) from about 0.1 to 50 percent by weight of a bis(triphenyl silyl) perfluorodicarboxylic acid ester having the formula

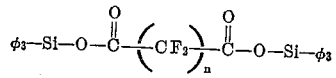

wherein $n$ is 1–8, and $\phi$ is phenyl.

6. The grease composition of claim 5 wherein $n$ is 3.

7. The grease composition of claim 5 wherein the amount of said thickener is from about 10 to about 50 percent by weight of the total grease composition, and the amount of said silicone oil is from about 10 to about 80 percent by weight of the total grease composition.

8. The grease composition of claim 7 wherein $n$ is 3.

9. The grease composition of claim 5 wherein the amount of:
   (a) said thickener is from about 20 to about 40 per percent by weight of the total grease composition;
   (b) said silicone oil is from about 20 to about 70 percent by weight of the total grease composition; and
   (c) said ester is from about 1 to about 10 percent by weight of the total grease composition.

10. The grease composition of claim 9 wherein $n$ is 3.

11. The grease composition of claim 10 wherein:
   (a) said thickener is about 35 parts ammeline;
   (b) said silicone oil is about 65 parts of a phenylmethyl silicone oil having a viscosity of 77° F. of 600 centistokes; and
   (c) said ester is about 3 parts.

References Cited

UNITED STATES PATENTS

| | | | |
|---|---|---|---|
| 2,966,508 | 12/1960 | Kerschner et al. | 260—488.2 |
| 2,984,624 | 5/1961 | Halter et al. | 252—50 |
| 3,160,591 | 12/1964 | Halter et al. | 252—50 |

FOREIGN PATENTS 926,700  5/1963  Great Britain.

DANIEL E. WYMAN, *Primary Examiner.*

I. VAUGHN, *Assistant Examiner.*

UNITED STATES PATENT OFFICE
CERTIFICATE OF CORRECTION

Patent No. 3,347,794                      October 17, 1967

Fred K. Kawahara

It is hereby certified that error appears in the above numbered patent requiring correction and that the said Letters Patent should read as corrected below.

Column 2, lines 14 and 15, for that portion of the formula reading "$(CF_2)_n$" read -- $(CF_2)_3$ --; column 3, line 55, for "prove" read -- provide --; column 8, line 2, for "of", first occurrence, read -- at --.

Signed and sealed this 29th day of October 1968.

(SEAL)
Attest:

Edward M. Fletcher, Jr.                      EDWARD J. BRENNER

Attesting Officer                            Commissioner of Patents